United States Patent [19]

Kawaoka

[11] Patent Number: 5,631,739
[45] Date of Patent: May 20, 1997

[54] VIDEO PRINTER WHICH SWITCHES TO A FIELD A MODE UPON DETERMINING A NON-STANDARD VIDEO SIGNAL AND METHOD THEREOF

[75] Inventor: Yoshiki Kawaoka, Saitama, Japan

[73] Assignee: Fuji Photo Film Co., Ltd., Kanagawa, Japan

[21] Appl. No.: 293,189

[22] Filed: Aug. 19, 1994

[30] Foreign Application Priority Data

Aug. 25, 1993 [JP] Japan .................................... 5-210457

[51] Int. Cl.$^6$ ........................ H04N 1/00; H04N 5/76; H04N 5/225
[52] U.S. Cl. ..................... 358/296; 358/909.1; 386/84
[58] Field of Search .................... 358/296, 400, 358/401, 500, 501, 909.1, 335; 348/220, 222; 355/202

[56] References Cited

U.S. PATENT DOCUMENTS

| | | | |
|---|---|---|---|
| 5,047,864 | 9/1991 | Fujito | .................................... 358/296 |
| 5,109,281 | 4/1992 | Kobori et al. | ........................ 358/296 |

*Primary Examiner*—Eric Frahm

[57] ABSTRACT

A video printer is automatically set in a field mode even when a frame mode is manually selected if an input video signal is nonstandardized. To determine whether the input video signal is standardized or not, the number of equalizing pulses generated during each vertical synchronizing period, that is, the number of cutting pulses, are checked. Also, the polarity of a field index signal is checked as to whether the polarity is inverted during each vertical synchronizing period. If the number of cutting pulses is below a predetermined value, and/or if the polarity of the field index signal is maintained unchanged, the video signal is determined nonstandardized.

10 Claims, 6 Drawing Sheets

VIDEO PRINTER WHICH SWITCHES TO A FIELD A MODE UPON DETERMINING A NON-STANDARD VIDEO SIGNAL AND METHOD THEREOF

BACKGROUND OF THE INVENTION

1. Field of the Invention

The present invention relates to a video printer for making a hard copy from an external video signal, and more particularly to a video printer which is set in either frame mode or field mode according to the kind of the video signal.

2. Related Art

A video printer for making a hard copy from a video signal such as NTSC signal, is provided with a frame mode and a field mode. In the frame mode, odd and even field data of one frame of the video data is written in frame memories, and is read out as a frame image for monitoring and printing. In the field mode, either odd field data or even field data is written in the frame memories, and is read out for monitoring or printing after being transformed into frame data by interpolation.

On the other hand, a video tape recorder (VTR) or a video camera outputs a special video signal in a special playback mode such as a stationary playback mode when the video tape is in pause and a reading head traces the same recording track on the video tape. The special video signal outputted in the stationary playback mode is added with a pseudo vertical synchronizing signal. Also a video signal outputted from a video game machine or the like is not composed of odd and even fields, but merely represents a single-field video image, in order to prevent flicker.

If the special video from the video game machine, having nonstandardized synchronizing signals, is input in the video printer set in the frame mode, the single-field data is written as frame data in the frame memory so that a bad image representing one field and lacking the other field is displayed or printed. Also the video signal having the pseudo synchronizing signal, such as input from a VTR in the stationary playback mode, cannot be properly monitored or printed by the video printer in the frame mode. This is because the number of horizontal scanning lines may be different between adjacent vertical scanning periods under some tracking conditions, and a consequent printed or displayed image may be deviated in the vertical position between the fields.

SUMMARY OF THE INVENTION

In view of the foregoing, a primary object of the present invention is to provide a video printer which is automatically set in an optimum mode even when the special video signal having nonstandardized synchronizing signal is input.

To achieve the above and other objects, a video printer having the frame mode and the field mode of the present invention separates synchronizing signals from an input video signal, determines whether the synchronizing signals are standardized or not, and switches to the field mode when the synchronizing signals are not standard.

For the determination, the number of equalizing pulses is checked during each vertical synchronizing period, and the input video signal is determined nonstandardized when the number is below a predetermined value.

In alternative, or in combination with the above determination, it is preferable to check a field index signal if its polarity is inverted during each vertical synchronizing period. If the field index signal always has the same polarity, the input video signal is determined nonstandardized.

The determination circuit may further output a second field index signal whose polarity is forcibly inverted when the first field index signal is not inverted.

According to the present invention, because the video printer is automatically switched to the field mode when a nonstandardized video signal is input, no error as described above could occur but, on the contrary, an optimum image will be displayed and printed at any time, even if the user forgets to set the video printer in the field mode or cannot select a suitable mode.

BRIEF DESCRIPTION OF THE DRAWINGS

Other objects and advantages of the present invention will become apparent in the following detailed description of the preferred embodiments when read in connection with the accompanying drawings, wherein like reference numerals designate like or corresponding parts throughout the several views, and wherein.

DETAILED DESCRIPTION OF THE PREFERRED EMBODIMENT

Figure 1:
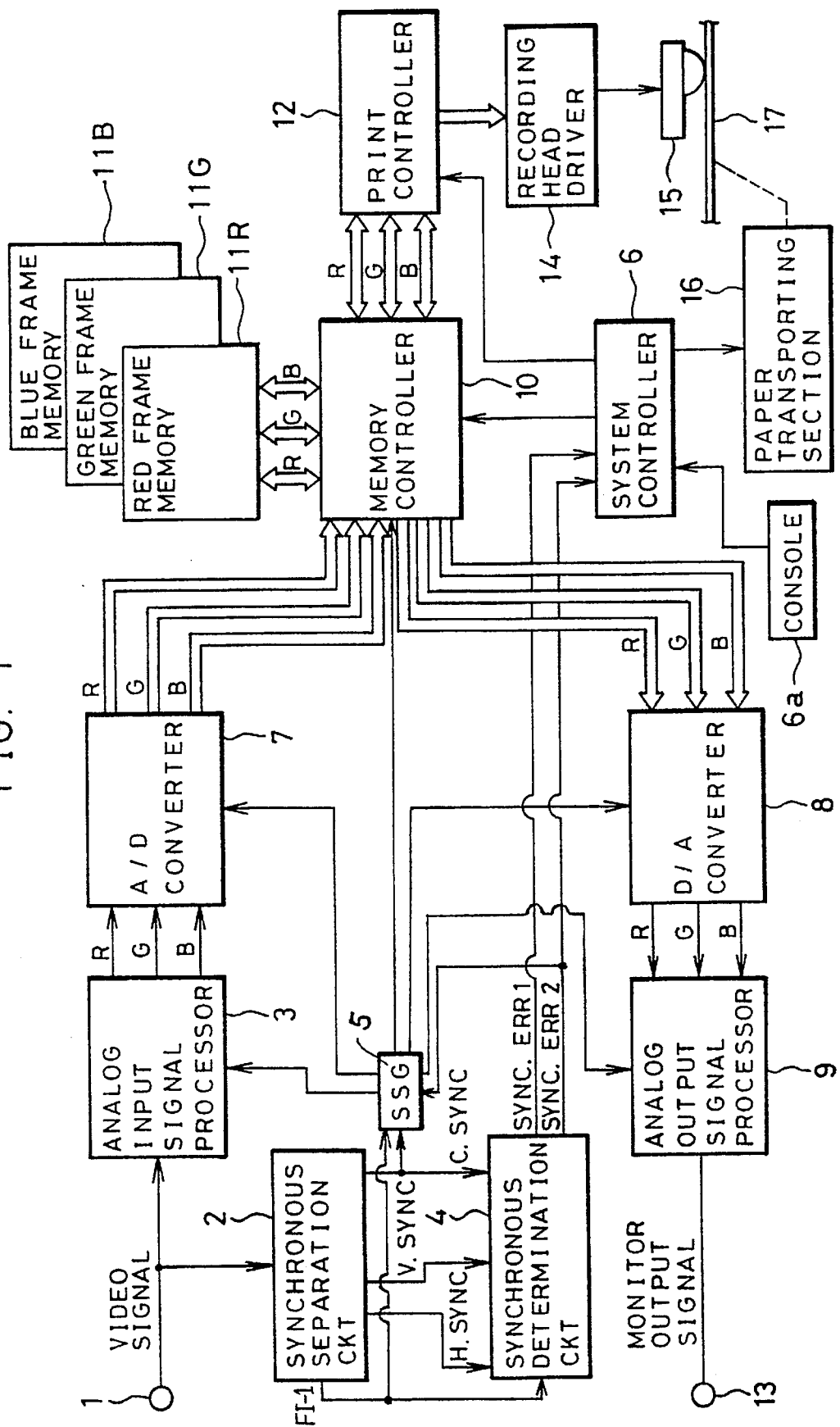
FIG. 1 is a block diagram of a video printer according to a preferred embodiment of the invention.

In FIG. 1, an input terminal 1 is connectable to a video camera, a video tape recorder (VTR), a still video player, a video game machine and so forth, to input video signals representing half-tone images. The video signals are input to a synchronous separation circuit 2 and an analog input signal processor 3. The synchronous separation circuit 2 separates a composite synchronizing signal (C.SYNC) from the input video signal, and separates a vertical synchronizing signal (V.SYNC) and a horizontal synchronizing signal (H.SYNC) from the composite synchronizing signal (C.SYNC). The synchronous separation circuit 2 includes a horizontal synchronizing signal generator to output a horizontal synchronizing signal when no horizontal synchronizing signal can be separated from the composite synchronizing signal. The synchronizing signals having high (H) and low (L) levels respectively are sent to a synchronous determination circuit 4. The C.SYNC signal is also sent to a synchronizing signal generator (SSG) 5.

The synchronous separation circuit 2 also generates a field index signal FI-1 whose polarity is inverted during each vertical synchronizing period when the phase of the V.SYNC signal shifts relative to the V.SYNC signal from that in the preceding vertical synchronizing period. Specifically, if a video standard signal, such as a NTSC signal, for instance, is input through the input terminal 1, because the phase of the V.SYNC signal relative to the H.SYNC signal of the NTSC signal changes in the odd field from that in the even field, the signal level of the field index signal FI-1 is inverted at every change of the field. If, on the other hand, a video signal having only one field is input, because the relationship between the V.SYNC and H.SYNC signals is maintained unchanged, the polarity or level of the field index signal FI-1 is maintained unchanged. The field index signal FI-1 is sent to the synchronous determination circuit 4 and the SSG 5. The synchronous determination circuit 4 outputs first and second synchronous error signals (SYNC.ERR1, SYNC.ERR2) to a system controller 6, and also outputs the SYNC.ERR 2 signal to the SSG 5.

The SSG 5 generates a sampling clock signal, the V.SYNC and H.SYNC signals from the C.SYNC signal, and sends these signals as timing signals to the analog input signal processor 3, an A/D converter 7, a D/A converter 8 and an analog output signal processor 9. The SSG 5 also outputs a second field index signal FI-2 as a timing signal to these portions 3, 7, 8 and 9, when the SYNC.ERR2 signal from the synchronous determination circuit 4 is in a low level, as will be described in more detail below. The level or polarity of the second field index signal FI-2 is forcibly inverted upon each rising edge of the V.SYNC signal. When the SYNC.ERR2 signal is in a high level, the SSG 5 directly outputs the first field index signal FI-1 as a timing signal to the portions 3, 7, 8 and 9.

For example, the time of inversion of the field index signal FI-1 or FI-2 is used by the memory controller 10 to determine the end or start of each field, for controlling the start of data writing in the frame memories 11R, 11G and 11B. The analog output signal processor 9 determines based on the signal level of the field index signal FI-1 or FI-2 as to which of two different scanning timing of the two field of one frame of a video signal should be used for outputting the video signal.

The analog input signal processor 3 separates the input video signal into red, green and blue color signals, and controls the level of the three color signals. The A/D converter 7 samples the respective color signals for each pixel and converts them into digital color video data. The consequent red, green and blue image data of each pixel is sent to a memory controller 10.

A red frame memory 11R, a green frame memory 11G and a blue frame memory 11B store image data corresponding to two fields in association with each scanning line of one frame. The memory controller 10 controls read and write of image data for each color.

The system controller 6 is connected to a console 6a, which is operated to input one of three commands "THROUGH", "PRINT" and "FREEZE". The console 6a is also provided with a field change switch for selecting either odd or even field, and a mode change switch for selecting either frame mode or field mode. The system controller 6 controls the memory controller 10 to read or write the frame memory 11R, 11G, 11B.

When the frame mode is selected on writing image data, the memory controller 10 writes image data of both fields in the frame memories 11R, 11G and 11B. When the field mode is selected, the memory controller 10 writes image data of one field in the frame memories 11R, 11G and 11B and interpolates image data based on the written image data to provide one frame of image data. When writing the video data, the memory controller 10 determines the start or end of each field based on the field index signal FI-1 or FI-2 from the SSG 5, so that the memory controller 10 may write the video data in the frame memories 11R, 11G and 11B, discriminating between the fields. The memory controller 10 also write the video data in synchronism with the sampling clock signal from the SSG 5, and hence with the sampling period of the A/D converter 7.

For monitoring, the memory controller 10 reads the image data from the frame memories 11R, 11G and 11B and sends it to the D/A converter 8. When printing, the memory controller 10 reads the image data line by line from the frame memories 11R, 11G and 11B and sends it to a print controller 12.

The D/A converter 8 converts the three color image data into analog RGB signals and sends them to the analog output signal processor 9. The analog output signal processor 9 converts the RGB signals to a NTSC video signal to display a frame image on a CRT monitor, e.g., a home TV, which is connected to an output terminal 13.

The print controller 12 processes the three color image data for masking, and converts it into yellow, magenta and cyan image data. The three color image data is sent to a recording head driver 14 one color after another. For example, first the yellow image data is sent to the recording head driver 14, and the recording head driver 14 selectively drives a plurality of heating elements of a thermal head 15 in accordance with the yellow image data. Synchronously with the driving of the thermal head 15, a paper transporting section 16 stepwise transports a color recording material 17, such as thermosensitive color paper having yellow, magenta and cyan recording layers, to record a yellow image line by line on the thermosensitive color recording paper 17. After optically fixing the yellow image, a magenta image is recorded and fixed in the same way as the yellow image. Thereafter, a cyan image is recorded in the same way as above, to complete a three color frame sequential recording of a full-color image.

Figure 2:
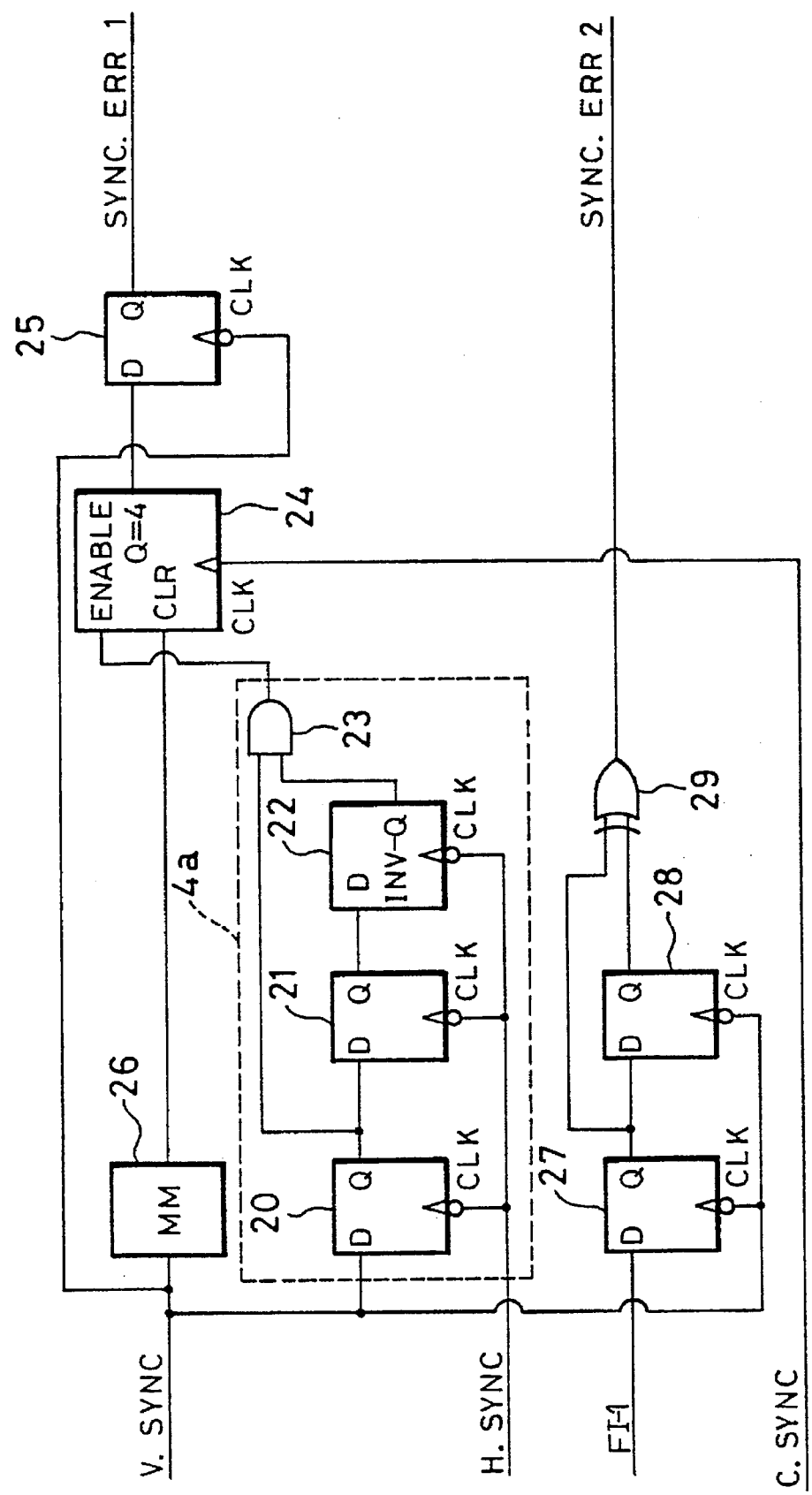
FIG. 2 is a logic diagram of a synchronous determination circuit of the video printer shown in FIG. 1.

FIG. 2 shows an example of the synchronous determination circuit 4 of FIG. 1. An enable signal generator 4a is constituted of a cascade of three D-type flip-flops (D-FFs) 20, 21 and 22 chained to one another in this order, and an AND gate 23. The D-FFs 20, 21 and 22 receive the H.SYNC signal at respective clock (CLK) terminals, such that a signal applied to a D terminal of each D-FF is latched at the timing of a native edge of the clock or H.SYNC signal. The first D-FF 20 receives the V.SYNC signal at its D terminal, and a Q terminal of the D-FF 20 is connected to a D terminal of the second D-FF 21. A Q terminal of the D-FF 21 is connected to a D terminal of the third D-FF 22. The Q terminal of the D-FF 20 and an inverted-Q (INV-Q) terminal of the D-FF 22 are connected to inputs of the AND gate 23. The AND gate 23 outputs an enable signal to an ENABLE terminal of a pulse counter 24. The enable signal has a pulse generated during each vertical synchronizing period and having a pulse duration corresponding to two horizontal scanning periods, that is, two pulse periods of the H.SYNC signal.

The pulse counter 24 is designed to count equalizing pulses or cutting pulses of the C.SYNC signal applied to its CLK terminal at the timing of their positive edges, so long as the enable signal output from the AND gate 23 is in the high level, that is, while the high level pulse of the enable signal being applied to the ENABLE terminal of the pulse counter 24. The equalizing and cutting pulses appear in the vertical blanking period of the C.SYNC signal. The cutting pulses are inverted equalizing pulses which appear during the vertical synchronizing period and have the same frequency and width as the equalizing pulses. Therefore, the cutting pulse may be considered as equivalent to the equalizing pulse. When the count reaches four, the pulse counter 24 outputs a high level signal from its Q=4 terminal to a D terminal of a D-FF 25.

A mono-multivibrator (MM) 26 receives the V.SYNC signal to output a pulse having a duration of 30 μs at the timing of each positive edge of the V.SYNC signal, and sends the pulse to a clear (CLR) terminal of the pulse counter 24. In response to the pulse applied to the CLR terminal, the pulse counter 24 is reset to zero.

The D-FF 25 latches the signal applied to its D terminal from the pulse counter 24, at the timing of negative edges of the V.SYNC signal, and outputs the latched signal from its Q terminal as the SYNC.ERR1 signal to the system controller 6.

A cascade of two D-FFs 27 and 28 receive the V.SYNC signal as their clock signal at their CLK terminals, such that the D-FFs 27 and 28 latch a signal input in their D terminal at the timing of each negative edge of the V.SYNC signal, and output the latched signal from their Q terminal. The D-FF 27 receives the field index signal FI-1 at its D terminal, and the Q terminal of the D-FF 27 is connected to a D terminal of the D-FF 28 and an input of an exclusive-or (EX-OR) gate 29. The Q terminal of the D-FF 28 is connected to another input of the EX-OR gate 29.

At each negative edge of the V.SYNC signal, the present level of the field index signal FI-1 is output from the Q terminal of the D-FF 27, and the preceding level of the field index signal FI-1 which has been output from the Q terminal of the D-FF 27 is then output from the Q terminal of the D-FF 28. The output of the EX-OR gate 29 is set to the high level when the signals on the Q terminals of the D-FFs 27 and 28 are at different levels. The output of the EX-OR gate 29 becomes a low level when the signals on the Q terminals of the D-FFs 27 and 28 are at the same level. The output of the EX-OR 29 is served as the SYNC.ERR2 signal to be sent to the SSG 5 and the system controller 6.

Figure 3:
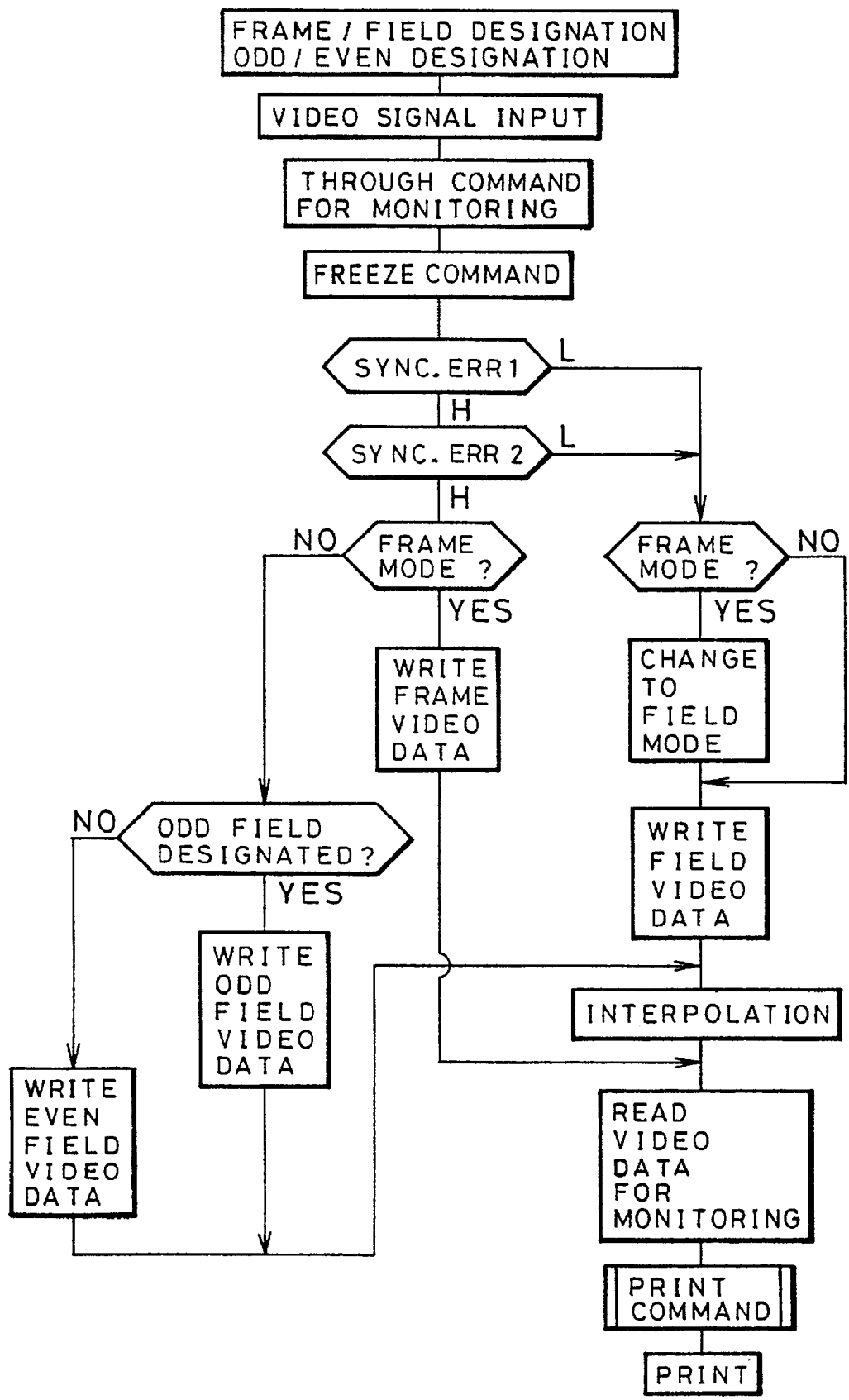
FIG. 3 is a flow chart illustrating the operation of the video printer shown in FIG. 1.

The operation of the above-described video printer is as follows:

As shown in FIG. 3, first the console 6a is operated to enter the command "THROUGH" and then to select one of the frame mode and the field mode. If the field mode is selected, then either odd field or even field is to be selected. When a NTSC standard video signal is to be input, a VTR or the like is connected to the input terminal and played in a normal playback mode. The NTSC signal is input in the synchronous separation circuit 2 and the analog input signal processor 3. The synchronous separation circuit 2 separates various synchronizing signals from the video signal, and generates the field index signal FI-1. Those signals are sent from the synchronous separation circuit 2 to the synchronous determination circuit 4. The C.SYNC signal and the field index signal FI-1 are also sent to the SSG 5 which controls respective sections at the timing based on the C.SYNC signal, and outputs the field index signal FI-1 or the second field index signal FI-2 depending on the level of the SYNC.ERR2 signal.

Figure 4:
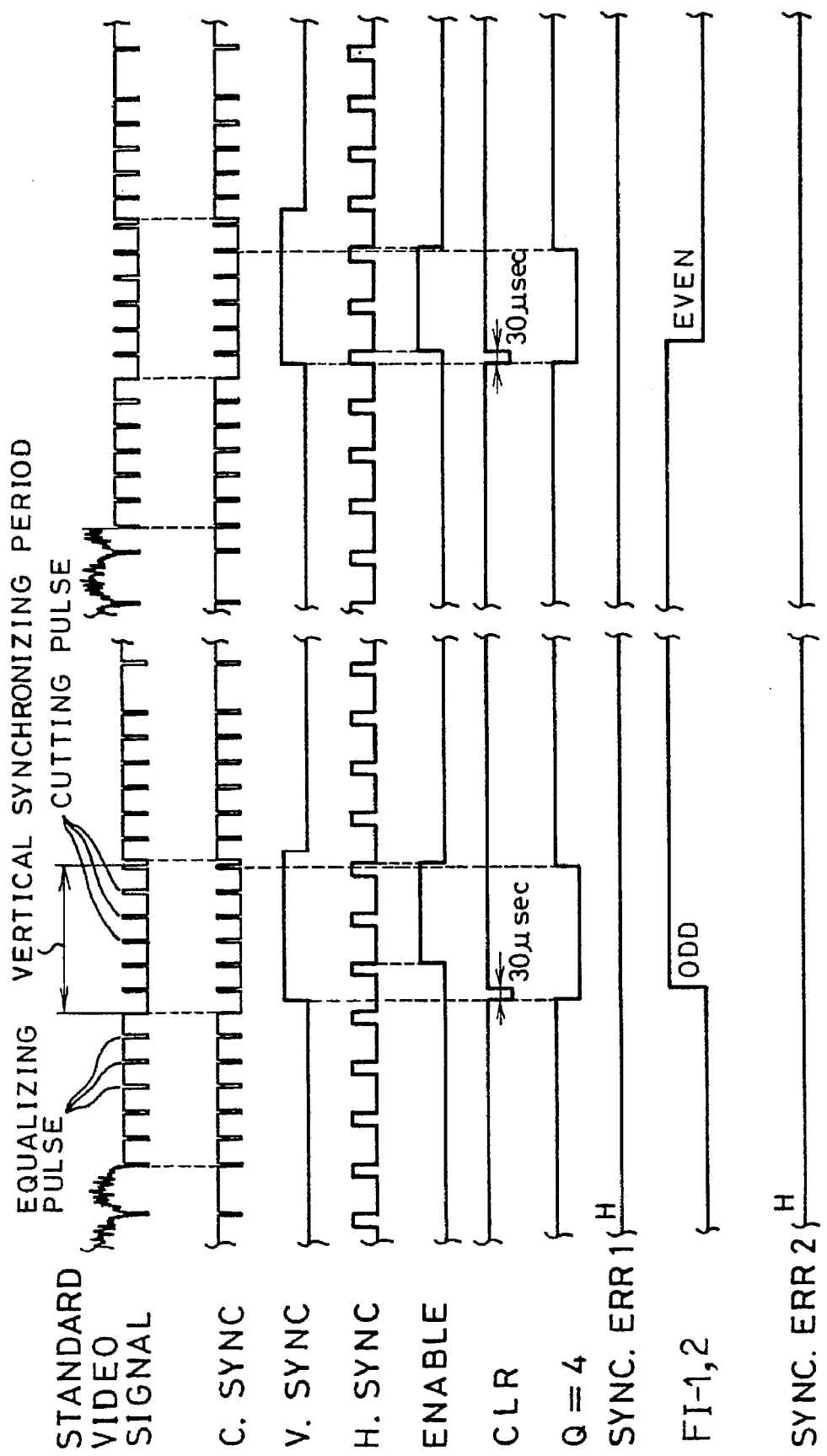
FIG. 4 is timing charts of signals processed in a synchronous separation circuit and the synchronous determination circuit shown in FIG. 3, concerning a video standard signal.

As shown in FIG. 4, the mono-multivibrator 26 outputs a 30 μs pulse to the CLR terminal of the pulse counter 24 at the timing of the positive edge of the V.SYNC signal. This 30 μs pulse resets the pulse counter 24 to zero, and thus sets the signal on the Q=4 terminal to the low level, which has been in the high level since the pulse counter 24 counted up to four during the preceding vertical synchronizing period. Simultaneously, the positive edge of the V.SYNC signal sets the signal on the D terminal of the D-FF 20 the high level. At the timing of the negative edge of the next pulse of the H.SYNC signal, the signal on the Q terminal of the D-FF 20 is set to the high level. Because the signal on the INV-Q terminal of the D-FF 22 has been in the high level, the enable signal appearing on the output of the AND gate 23 becomes the high level, to enable the pulse counter 24 to count.

Then, the pulse counter 24 counts one increment for each positive edge of the cutting pulses during the vertical synchronizing period. At the moment when the count reaches four, the signal on the Q=4 terminal is set to the high level. At the negative edge of the second of those pulses of the H.SYNC signal which are input in the CLK terminals of the first to third D-FF 20, 21 and 22 in a time interval from the reset to the count four of the pulse counter 24, the signal on the Q terminal of the second D-FF 21 is changed to the high level, whereas the Q terminal of the first D-FF 20 and the signal on the INV-Q terminal of the third D-FF 22 are maintained high level. Upon the negative edge of the H.SYNC signal which appears immediately after the pulse counter 24 counts up to four, the third D-FF 22 latches the high level signal outputted from the Q terminal of the second D-FF 21. As a result, the signal on the INV-Q terminal is changed to the low level, so that the output of the AND gate 23 or the enable signal is set to the low level to disable the pulse counter 24. Thereafter, the pulse counter 24 does not count the equalizing pulses.

Immediately thereafter, the D-FF 25 latches the high level signal from the Q=4 terminal of the pulse counter 24 at the timing of the negative edge of the V.SYNC signal, and thus the SYNC.ERR1 signal on the Q terminal of the D-FF 25 is in the high level, continuously from the preceding even field in this instance. After the vertical synchronizing period is over, because the V.SYNC signal is in the low level, the D-FFs 20 to 22 sequentially latch the low level signal at the timing of the negative edge of the H.SYNC signal, so that the signals on Q terminals of the first and second D-FFs 20 and 21 are reset to the low level, and the signal on the INV-Q terminal of the third D-FF 22 is reset to the high level. Therefore, the output of the AND gate 23 is maintained low level, and the pulse counter 24 does not count the equalizing pulses of the C.SYNC signal.

On the other hand, the signal on the Q terminal of the D-FF 27 has been in the low level since the D-FF 27 latched the field index signal FI-1 upon the negative edge of the preceding V.SYNC signal when the level of the field index signal FI-1 was low, in this instance. Therefore, upon the negative edge of the V.SYNC signal, the D-FF 28 latches the low level signal on the Q terminal of the D-FF 27. Concurrently, because the field index signal FI-1 has been changed to the high level during the present vertical synchronizing period, the D-FF 27 latches the high level field index signal FI-1 and changes its Q terminal to the high level. Therefore, the SYNC.ERR2 signal outputted from the EX-OR gate 29 is in the high level. When the SYNC.ERR2 becomes high, the SSG 5 outputs the FI-1, which is output from the synchronous determination circuit 2 and whose level is inverted upon each field change, directly as the timing signal, so that the respective elements can operate in the proper timing.

The SYNC.ERR1 signal and the SYNC.ERR2 signal are not changed by the synchronous signals and the field index signal FI-1 which are input in the synchronous determination circuit 4 during the odd field period following the vertical blanking period.

In the vertical blanking period following the odd field, the MM 26 outputs a 30 μs pulse upon the positive edge of the V.SYNC signal, so that the pulse counter 24 is reset to zero to change the Q=4 terminal to the low level. The output of the AND gate 23 is set to the high level in the same way as in the above described vertical blanking period, thereby enabling the pulse counter 24 to count the cutting pulses. At the moment when the count reaches four, the Q=4 terminal is set to the high level. Upon a negative edge of the H.SYNC signal which occurs immediately thereafter, the pulse counter 24 is disabled.

Therefore, the level of the SYNC.ERR1 signal is maintained high when the level on the Q=4 terminal is latched by the D-FF 25 upon the following negative edge of the V.SYNC signal. At the timing of this negative edge the V.SYNC signal, the D-FF 28 latches the high level signal on the Q terminal of the D-FF 27, which has been in the high level throughout the odd field, as set forth above. As a result, the Q terminal of the D-FF 28 changes to the high level. Simultaneously, the D-FF 27 latches the field index signal FI-1 whose level has been changed to low during the vertical synchronizing period, so that the Q terminal of the D-FF 27 changes to the low level. Therefore, the SYNC.ERR2 signal is maintained in the high level. The SYNC.ERR1 and SYNC.ERR2 signals are not changed during the even field too. Consequently, the SYNC.ERR1 and SYNC.ERR2 signals are always in the high level for the video standard signal in the normal playback mode.

Referring again to FIG. 3, in response to the "THROUGH" commend entered through the console 6a, the system controller 6 outputs a through command signal to the memory controller 10. The analog input signal processor 3 separates the video signal into red, green and blue signals, which are quantized to be digital color video data through the A/D converter 7 and sent to the memory controller 10. The memory controller 10, as receiving the through command signal, sends the input three color video data directly to the monitor through the D/A converter 8, the analog output signal processor 9 and the output terminal 13.

Observing the video image displayed on the monitor, the user enters the "FREEZE" command through the console 6a, to designate an image to be printed. Because the SYNC.ERR1 and SYNC.ERR2 signals are in the high level, in this instance, the system controller 6 determines the input video signal as standard NTSC signal. Then, if the system controller 6 determines that the frame mode is selected, a frame writing signal is sent to the memory controller 10. In response to the frame writing signal, the memory controller 10 writes the three color video data of both odd and even fields of one frame in the frame memories 11R, 11G and 11B. If the field mode is selected, the system controller 6 sends either one of odd and even field writing signals to the memory controller 10. The memory controller 10 writes the video signal of designated one field in the frame memories 11R, 11G and 11B. Because the memory controller 10 receives the second field index signal FI-1 whose level is inverted upon each field change, the memory controller 10 can discriminate between the fields to exactly write the video data in the frame memories 11R, 11G and 11B.

Thereafter, the system controller 6 instructs the memory controller 10 to read the frame memories 11R, 11G and 11B. First, odd field video data which is addressed to odd scanning lines, is read out from the frame memories and sent to the D/A converter 8. Thus, an odd field image is displayed on the monitor. Next, even field video data which is addressed to even scanning lines, is read out to display an even field image. By repeating this operation, a frame image is displayed as a still image on the monitor. After checking the displayed frame image, the "PRINT" command may be entered through the console 6a to print out the displayed image as a hard copy.

When the system controller 6 sends a print command signal to the memory controller 10. Then, the memory controller 10 reads out the video data line by line from the frame memories 11R, 11G and 11B, and sends the three color video data of one line to the print controller 12. The print controller 12 corrects the color balance and the gradation of the three color video data of one line. The print controller 12 converts the corrected red, green and blue video data into yellow, magenta and cyan image data of one line. Only the yellow image data is sent to the recording head driver 14, which then drives the thermal head 15 in accordance with the yellow image data, to record the first line of the yellow image on the yellow recording layer of the thermosensitive color recording paper 17. In the same way as above, the yellow image of one frame is recorded line by line on the thermosensitive color recording paper 17. Thereafter, the thermosensitive color recording paper 17 is exposed to ultraviolet rays having a predetermined wavelength range for optically fixing the yellow recording layer of the recording paper 17.

After the yellow image recording, the recording paper 17 is transported to oppose to the thermal head 15 again, to start thermal recording of the magenta image. Also in the magenta image recording, the three color video data of one line is read out from the frame memories 11R, 11G and 11B, to drive the thermal head 15 through the recording head driver 14, so as to record the magenta image line by line on the magenta recording layer of the recording paper 17. After the magenta image of one frame is recorded, the magenta recording layer is optically fixed by ultraviolet rays having a predetermined wavelength range.

Finally, the cyan image of one frame is recorded line by line on the cyan recording layer of the recording paper 17, in the same way as the yellow and magenta images. Optical fixing of the cyan recording layer is not usually performed.

Now, a case where a special or nonstandardized video signal is input into the video printer will be described.

Figure 5:
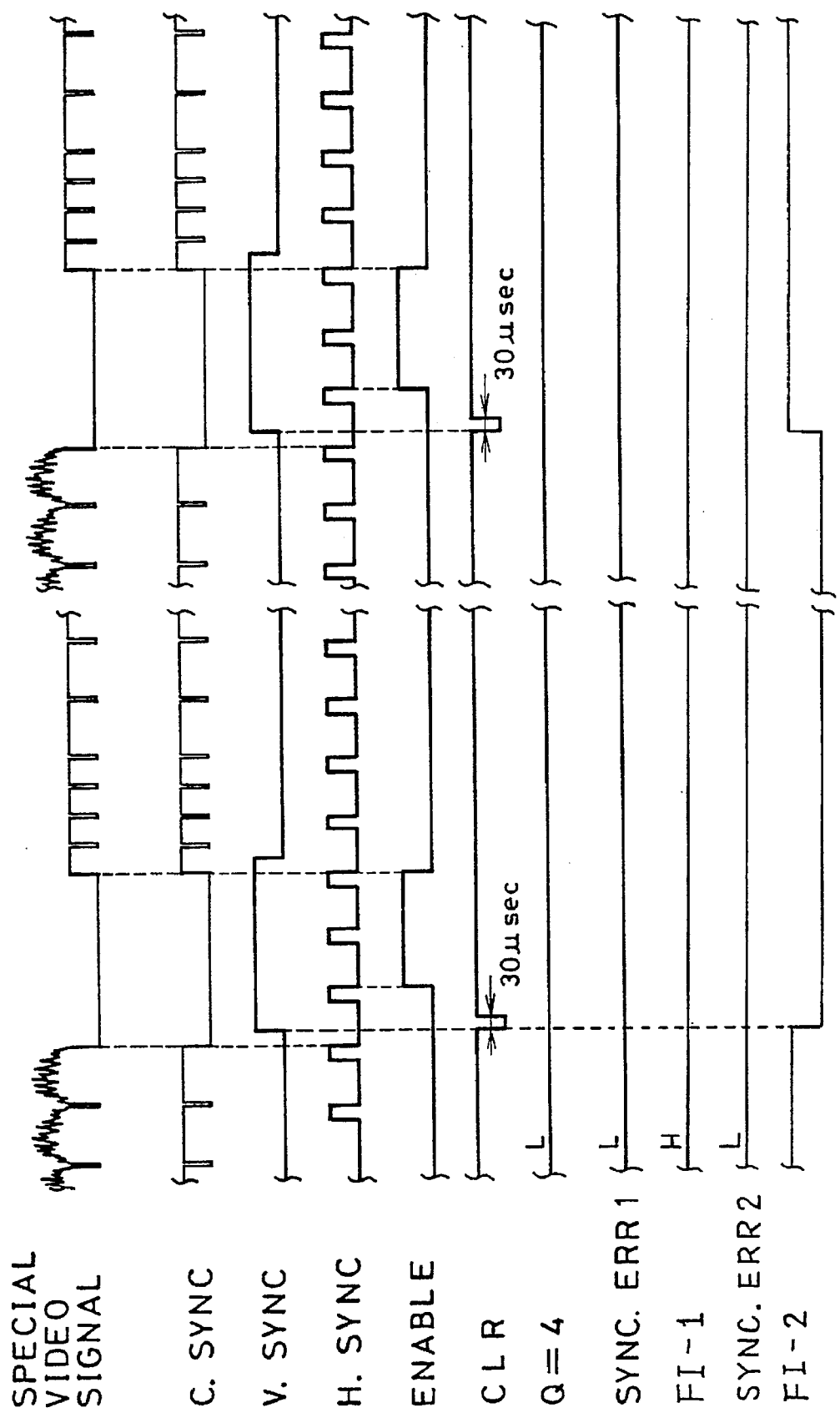
FIG. 5 is timing charts of signals used in the synchronous determination circuit shown in FIG. 3, concerning a still video signal input from a video tape recorder in a stationary picture display mode.

As shown in FIG. 5, a video signal from the VTR played in a stationary playback mode has no equalizing pulse nor cutting pulse which appear in the vertical blanking period of the standard NTSC signal.

In the synchronous determination circuit 4, the MM 26 outputs a 30 μs pulse upon a positive edge of the V.SYNC signal to reset the pulse counter 24 to zero. During the vertical synchronizing period, the enable signal generator 4a outputs a high level pulse having a width corresponding to two cycles of the H.SYNC signal, to enable the pulse counter 24 to count. However, because no cutting pulse appears in this case, the Q=4 terminal of the pulse counter 24 is maintained in the low level. Therefore, the D-FF 25 latches the low level signal on the Q=4 terminal upon a negative edge of the V.SYNC signal, so that the SYNC.ERR1 signal is in the low level.

If the SYNC.ERR1 signal is low, the system controller 6 determines that the input video signal is nonstandardized signal. If at that time the video printer is set in the frame mode, the system controller 6 forcibly switches to the field mode, and outputs the field writing signal to the memory controller 10. The memory controller 10 then writes video data of one field, which is sent from the A/D converter 7, in the frame memories 11R, 11G and 11B. Thereafter, the memory controller 10 interpolates video data between the field video data to form a frame of video data. The interpolated frame video data is read out from the frame memories 11R, 11G and 11B to display a video image on the monitor.

Because the video signal shown in FIG. 5 represents merely one field which is repeatedly and continuously played, the field index signal FI-1 derived from this video signal has no level change. Therefore, the Q terminals of the D-FFs 27 and 28 are maintained in the same level, and the output of the EX-OR gate 29, that is, the SYNC.ERR2 signal is always in the low level. When the SYNC.ERR2 signal is low, the SSG 5 generates the second field index signal FI-2 whose level is inverted upon each rising edge of the V.SYNC signal. Based on the second field index signal FI-2, the respective portions can operate at the correct timing even when the level of the first field index signal FI-1 is not inverted.

For a video signal which is obtained by alternately reproducing odd and even fields in a specific mode, for which the level of the field index signal FI-1 are inverted upon each field change, the SYNC.ERR2 signal becomes high, so that the field index signal FI-1 is directly output from the SSG 5 and is used as the timing signal.

When the displayed image is to be printed, the "FREEZE" command is entered. Then, the video data is read out from the frame memories 11R, 11G and 11B line by line to record the image on the thermosensitive color recording paper 17, in the same way as set forth above.

Figure 6:
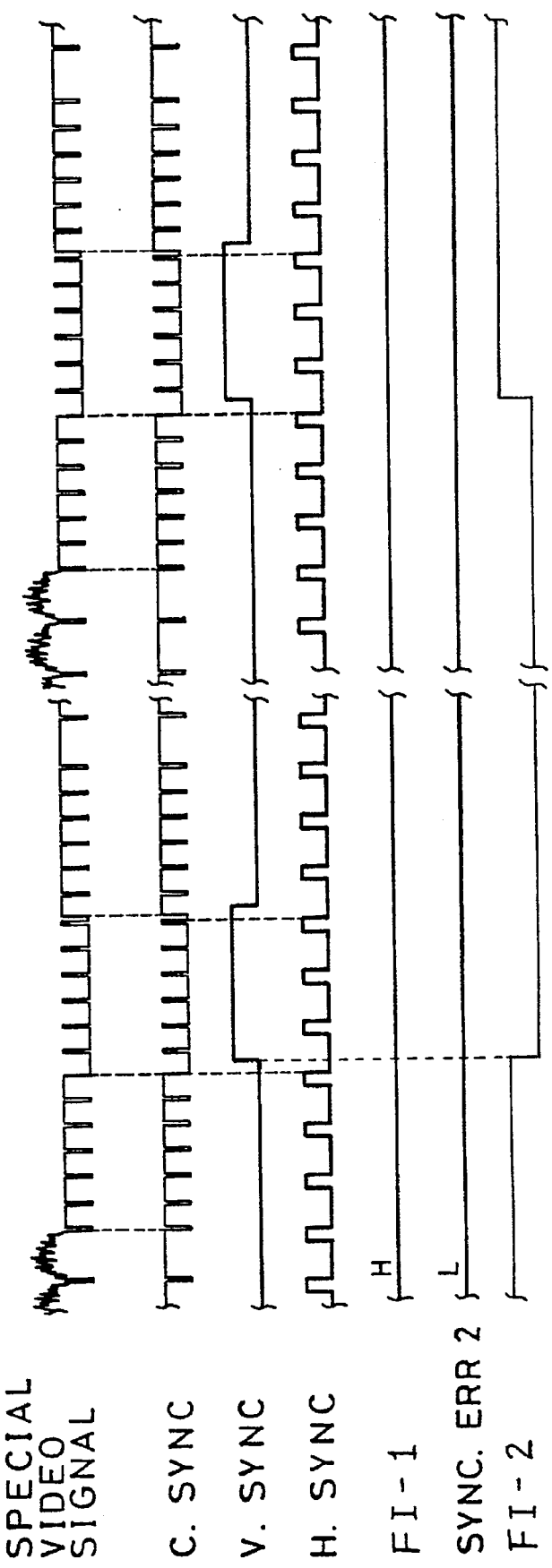
FIG. 6 is timing charts of signals used in the synchronous determination circuit shown in FIG. 3, concerning a video signal input from a video game machine.

In a case of video signal output from a video game machine, as shown in FIG. 6, the polarity of the field index signal FI-1 does not change. Therefore, the signals on the Q terminals of the D-FFs 27 and 28 are always in the same level, so that the output of the EX-OR gate 29, that is, the SYNC.ERR2 signal is always low. If the SYNC.ERR2 signal is low, the system controller 6 determines the input video signal as a nonstandardized signal, and outputs the field writing signal to the memory controller 10, in the same way as for the video signal shown in FIG. 5. In this case, the SYNC.ERR2 signal becomes high, so that the SSG 5 output the second field index signal FI-2 as the timing signal to the respective portions, thereby to enable the respective portions to operate properly.

As described so far, because the video printer is automatically switched to the field mode when the input video signal is not standard, the first described troubles could not arise which would arise if the video printer is in the frame mode while receiving a nonstandardized video signal.

Although in the above-described embodiment, interpolation of the video data between field video data written in the frame memories 11R, 11G and 11B is performed before monitoring in the field mode, it is possible to display a field image on the monitor, and make the interpolation each time the printing is instructed. It is also possible to write chrominance data (C) and luminance data (Y) in frame memories, instead of red, green and blue video data.

While the present invention has been described with respect to the direct thermal recording type video line printer, the present invention is applicable to other types of video printer, such as thermal transfer printers, ink jet printer, serial printer, page printer, and so forth.

Thus, the present invention should not be limited to the above-described embodiments but, on the contrary, various modifications may be possible without departing from the scope and spirit of the appended claims.

What is claimed is:

1. A video printer for making a hard copy from a video signal input therein, said video printer being selectably set in one of a frame mode for memorizing and printing an image using one frame of said video signal, and a field mode for memorizing and printing an image using one field of said video signal, said video printer comprising:

a separation circuit for separating synchronizing signals from said video signal;

a determination circuit for determining whether said synchronizing signals are standardized or not; and a switching section connected to said determination circuit, for switching said video printer to the field mode when said synchronizing signals are determined to be nonstandardized.

2. A video printer as claimed in claim 1, wherein said determination circuit checks the number of equalizing pulses contained in said video signal during each vertical synchronizing period of said video signal, and determines said video signal to be nonstandardized when said number is below a predetermined value.

3. A video printer as claimed in claim 1 or 2, wherein said separation circuit further outputs a field index signal whose polarity is inverted during each vertical synchronizing period when the phase of a vertical synchronizing signal shifts relative to a horizontal synchronizing signal from that in the preceding vertical synchronizing period, and said determination circuit checks if the polarity of said field index signal is inverted during each vertical synchronizing period, and determines said video signal to be nonstandardized when said field index signal always has the same polarity.

4. A video printer as claimed in claim 3, wherein said determination circuit further outputs a second field index signal whose polarity is forcibly inverted upon each rising edge of said vertical synchronizing signal when said first field index signal is not inverted.

5. A video printer for making a hard copy from a video signal input therein, said video printer being selectably set in one of a frame mode for memorizing and printing an image using one frame of said video signal, and a field mode for memorizing and printing an image using one field of said video signal, said video printer comprising:

a synchronous separation circuit for separating a composite synchronizing signal from said video signal, said composite synchronizing signal being composed of a vertical synchronizing signal, a horizontal synchronizing signal and equalizing pulses, and outputting a field index signal whose polarity is to be inverted during each vertical synchronizing period when said video signal is standardized;

a counter for counting said equalizing pulses during each vertical synchronizing period and outputting a first signal when the number of said equalizing pulses reaches a predetermined value;

a first latching device for latching said field index signal at the end of each vertical synchronizing period;

a second latching device for latching the polarity of said field index signal which was latched by said first latching device at the end of the preceding vertical synchronizing period;

a comparator for comparing the polarity of said field index signal latched by said first latching device with the polarity latched by said second latching device, and outputting a second signal when the compared polarities are different;

a determination circuit which determines that said video signal is standardized if both of said first and second signals are output; and a switching section connected to said determination circuit, for switching said video printer to the field mode unless said video signal is determined to be standardized.

6. A method for making a hard copy from a video signal input to a video printer, comprising the steps of:

selectably setting the video printer in one of a frame mode for storing and printing an image using one frame of the video signal, and a field mode for storing and printing an image using one field of the video signal;

separating synchronizing signals from the video signal;

determining whether the synchronizing signals are standardized or not; and switching the video printer to the field mode when the synchronizing signals are determined to be nonstandardized by said determining step.

7. The method as claimed in claim 6, wherein said determining step includes checking a number of equalizing pulses contained in the video signal during each vertical synchronizing period of the video signal, and designating the video signal to be nonstandardized when said number is below a predetermined value.

8. The method as claimed in claim 6 or 7, wherein said separating step includes outputting a first field index signal whose polarity is inverted during each vertical synchronizing period when the phase of a vertical synchronizing signal shifts relative to a horizontal synchronizing signal from that in the preceding vertical synchronizing period, and said determining step includes checking if the polarity of the first field index signal is inverted during each vertical synchronizing period, and designating the video signal to be nonstandardized when the first field index signal always has the same polarity.

9. The method as claimed in claim 8, wherein said determination step further includes outputting a second field index signal whose polarity is forcibly inverted upon each rising edge of the vertical synchronizing signal when the first field index signal is not inverted.

10. A method for making a hard copy from a video signal input to a video printer, comprising the steps of:

selectably setting the video printer in one of a frame mode for storing and printing an image using one frame of the video signal, and a field mode for storing and printing an image using one field of the video signal;

separating a composite synchronizing signal from the video signal, the composite synchronizing signal being composed of a vertical synchronizing signal, a horizontal synchronizing signal and equalizing pulses;

outputting a field index signal whose polarity is to be inverted during each vertical synchronizing period when the video signal is standardized;

counting the equalizing pulses during each vertical synchronizing period and outputting a first signal when the number of the equalizing pulses reaches a predetermined value;

a first latching step of latching the field index signal at the end of each vertical synchronizing period;

a second latching step of latching the polarity of the field index signal which was latched by said first latching step at the end of the preceding vertical synchronizing period;

comparing the polarity of the field index signal latched by said first latching step with the polarity latched by said second latching step;

outputting a second signal when the compared polarities are different;

determining that said video signal is standardized if both of said first signal and second signals are output; and switching the video printer to the field mode unless said video signal is determined to be standardized by said determining step.

* * * * *